June 9, 1931.　　　　E. G. ALLEN　　　　1,809,663

TROLLING SPOON

Filed Sept. 17, 1930

Edward G. Allen
INVENTOR

BY Victor J. Evans
ATTORNEY

Patented June 9, 1931

1,809,663

UNITED STATES PATENT OFFICE

EDWARD G. ALLEN, OF EVERETT, WASHINGTON

TROLLING SPOON

Application filed September 17, 1930. Serial No. 482,626.

This invention relates to a trolling spoon, the general object of the invention being to so form this spoon that it will give four flashes and when drawn through the water will simulate a small fish or minnow swimming through the water.

This invention also consists in certain other features of construction and in the combination and arrangement of the several parts, to be hereinafter fully described, illustrated in the accompanying drawings, and specifically pointed out in the appended claims.

In describing my invention in detail, reference will be had to the accompanying drawings, wherein like characters denote like or corresponding parts throughout the several views, and in which.

Figure 1:
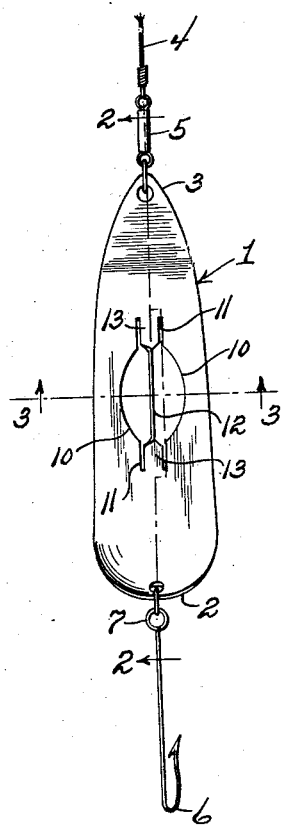
Figure 1 is a plan view of the device.
Figure 2:
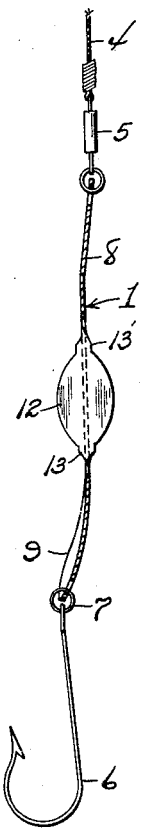
Figure 2 is a section on the line 2—2 of Figure 1.
Figure 3:
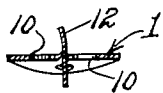
Figure 3 is a section on the line 3—3 of Figure 1.

As shown in these views the device indicated by the numeral 1 is formed of sheet metal and is of elongated form with its rear end rounded as shown at 2, and its front end rounded to a point as shown at 3. The line 4 is connected at the front end by the swivel 5 and a hook 6 is connected to the rear end by the rings 7. The device is provided with holes for receiving the connecting rings. The front end of the device is substantially flat and bent downwardly as shown at 8 and the rear end is bent upwardly and has its sides curving upwardly as shown at 9. Thus this rear end is of substantially concavo-convex shape in cross section. The center of the device is cut on the outwardly curved line 10 and at each end of the line 10 the metal is cut on a straight line 11 so as to provide an oval shaped part 12 with a tongue 13 at each end thereof. The part 12 is bent at right angles to the body 1 by twisting the points of connection of the part 12 with the tongues.

Thus the spoon will give four flashes as it is drawn through the water, two of the flashes being given by the sides of the member 12 and the other two by the sides of the body 1. The part 12 prevents the device from rotating in the water. The part 9 gives the device a slight wobbling movement and causes the device to assume a horizontal position in the water when the device has been caused to dive by the part 8 under the action of the line, and as before stated, the device when drawn through the water simulates the swimming motion of a minnow.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A trolling spoon comprising a body of elongated form and stamped from sheet metal, the front end of the body being bent downwardly and the rear end upwardly, said rear end being of concavo-convex shape in cross section, a hook connected with the rear end, a swivel connected with the front end, a line connected with the swivel, an opening in the center of the body and a member extending through the center of the opening and connected with the body and arranged at right angles to the body.

2. A trolling spoon stamped from sheet metal and comprising a body of elongated form, a hook at one end of the body, a line swiveled to the other end, the center of the body being cut to form an oblong member with a tongue at each end thereof, said member being bent at an angle to the body.

3. A trolling spoon comprising a body formed from sheet metal open at its center and being of a length greater than its width, a member in the open center and connected at opposite points with the body and arranged longitudinally at substantially right angles to said body, a hook connected with the body, and means for attaching a line to said body.

In testimony whereof I affix my signature.

EDWARD G. ALLEN.